(12) United States Patent
Jia et al.

(10) Patent No.: US 10,181,935 B2
(45) Date of Patent: Jan. 15, 2019

(54) PILOT CONFIGURATION METHOD AND APPARATUS

(71) Applicant: Huawei Technologies Co., Ltd., Shenzhen (CN)

(72) Inventors: Ming Jia, Ottawa (CA); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 15/361,105

(22) Filed: Nov. 25, 2016

(65) Prior Publication Data

US 2017/0078069 A1   Mar. 16, 2017

Related U.S. Application Data

(63) Continuation of application No. PCT/CN2014/078390, filed on May 26, 2014.

(51) Int. Cl.
| | |
|---|---|
| *H04L 12/28* | (2006.01) |
| *H04L 5/00* | (2006.01) |
| *H04W 72/04* | (2009.01) |
| *H04W 72/08* | (2009.01) |
| *H04W 72/10* | (2009.01) |
| *H04J 1/16* | (2006.01) |

(52) U.S. Cl.
CPC ............ *H04L 5/0051* (2013.01); *H04L 5/005* (2013.01); *H04L 5/0026* (2013.01); *H04W 72/04* (2013.01); *H04W 72/082* (2013.01); *H04W 72/10* (2013.01)

(58) Field of Classification Search
USPC .......... 370/252, 230, 329, 386, 430
See application file for complete search history.

(56) References Cited

U.S. PATENT DOCUMENTS

| | | | |
|---|---|---|---|
| 8,867,446 B2 * | 10/2014 | Kang | H04B 7/061 370/328 |
| 8,902,809 B2 | 12/2014 | Sun et al. | |
| 2004/0235472 A1 * | 11/2004 | Fujishima | H04B 7/0408 455/434 |
| 2005/0136963 A1 * | 6/2005 | Frank | H04B 7/0634 455/522 |
| 2008/0273510 A1 | 11/2008 | Mudulodu et al. | |
| 2011/0075625 A1 | 3/2011 | Nystrom et al. | |
| 2012/0014465 A1 | 1/2012 | Zhang et al. | |

FOREIGN PATENT DOCUMENTS

| | | |
|---|---|---|
| CN | 101877689 A | 11/2010 |
| CN | 102711251 A | 10/2012 |
| CN | 102724682 A | 10/2012 |

* cited by examiner

*Primary Examiner* — John Pezzlo
(74) *Attorney, Agent, or Firm* — Leydig, Voit & Mayer, Ltd.

(57) ABSTRACT

Disclosed are a pilot configuration method and an apparatus. The method includes: before allocating a pilot to a first user, determining, by a base station, interference between the first user and a second user if the base station allocates a pilot of the second user to the first user; if the interference between the first user and the second user is less than a preset threshold, the pilot allocated by the base station to the first user is the same as a pilot used by the second user; or if the interference between the first user and the second user is greater than or equal to the preset threshold, the pilot allocated by the base station to the first user is different from the pilot used by the second user.

14 Claims, 6 Drawing Sheets

PILOT CONFIGURATION METHOD AND APPARATUS

CROSS-REFERENCE TO RELATED APPLICATIONS

This application is a continuation of International Application No. PCT/CN2014/078390, filed on May 26, 2014, the disclosure of which is hereby incorporated by reference in its entirety.

TECHNICAL FIELD

The present disclosure relates to the communications field, and in particular, to a pilot configuration method and an apparatus.

BACKGROUND

A multiple user multiple input multiple output (MU-MIMO) technology, as one of core technologies of wireless communication standards, such as the 3rd Generation Partnership Project (3GPP) Long Term Evolution (LTE) and Long Term Evolution Advanced (LTE-A), can improve spectral efficiency and a system capacity of a wireless communications system. A pilot signal, as a constituent part of the MU-MIMO technology, is used to identify different antennas, and guide a user to perform channel estimation, so that the user can receive data correctly. In addition, a pilot signal occupies a transmission resource. For an entire communications system, excessively high pilot overheads cause congestion in the communications system. As a result, useful data cannot be transmitted in time.

In the prior art, a spatial multiplexing technology is used to reduce pilot overheads, where users that are paired with each other use a same pilot, and orthogonalization of a pilot signal of the paired users is implemented at a transmit end, so that each user receives a corresponding pilot signal.

In a process for implementing reduction of the pilot signal overheads in the foregoing, the inventor finds that interference exists between multiple paired users that use a common pilot, and strength of an orthogonal pilot signal received by a user to whom interference is larger is weaker. In this way, although pilot overheads are reduced, accuracy of user channel estimation is affected, and therefore, correct data reception of a user is affected.

SUMMARY

Embodiments of the present disclosure provide a pilot configuration method and an apparatus, which can reduce pilot overheads in a case in which accuracy of user channel estimation is ensured.

To achieve the foregoing objective, the following technical solutions are used in the embodiments of the present disclosure:

According to a first aspect, a base station is provided, including:

an interference acquiring unit, configured to: before the base station allocates a pilot to a first user, determine interference between the first user and a second user if a pilot of the second user is allocated to the first user; and a pilot allocation unit, configured to allocate a pilot to the first user according to the interference between the first user and the second user, where if the interference that is between the first user and the second user and that is acquired by the interference acquiring unit is less than a preset threshold, the pilot allocated to the first user is the same as the pilot used by the second user; or if the interference that is between the first user and the second user and that is acquired by the interference acquiring unit is greater than or equal to the preset threshold, the pilot allocated to the first user is different from the pilot used by the second user.

With reference to the first aspect, in a first possible implementation manner, if interference between N second users and the first user is less than the preset threshold value, and N is a natural number greater than or equal to 2, the interference acquiring unit is further configured to:

acquire a sum of interference corresponding to a pilot of each second user of the N second users, where a sum of interference corresponding to a pilot of the $i^{th}$ second user of the N second users is:

a sum of interference between the first user and all second users of the pilot of the $i^{th}$ second user when the pilot of the $i^{th}$ second user is allocated to the first user, where $1 \leq i \leq N$; and the pilot allocation unit is further configured to: if a sum of interference, corresponding to a pilot of the $j^{th}$ second user of the N second users, acquired by the interference acquiring unit is the smallest, allocate the pilot of the $j^{th}$ second user to the first user, where $1 \leq j \leq N$.

With reference to the first aspect or the first possible implementation manner of the first aspect, in a second possible implementation manner, the base station further includes:

a spatial multiplexing unit, configured to perform spatial multiplexing on pilots, allocated by the pilot allocation unit, of the first user and paired users, where the paired users are users that use a same pilot as the first user.

With reference to the second possible implementation manner of the first aspect, in a third possible implementation manner, the spatial multiplexing unit is specifically configured to:

pre-code the pilots of the first user and the paired users.

With reference to the second possible implementation manner of the first aspect, in a fourth possible implementation manner, the spatial multiplexing unit is specifically configured to:

perform beamforming on the pilots of the first user and the paired users.

With reference to the first aspect or any one of the first to the fourth possible implementation manners of the first aspect, in a fifth possible implementation manner, the base station further includes:

a first selection unit, configured to determine, from users to which no pilot is allocated, a user that is first scheduled on a scheduling resource as the first user, where the scheduling resource is a scheduling resource used by the users to which no pilot is allocated.

With reference to the first aspect or any one of the first to the fourth possible implementation manners of the first aspect, in a sixth possible implementation manner, the base station further includes:

a second selection unit, configured to determine, from users to which no pilot is allocated, a user with a highest priority as the first user.

According to a second aspect, a base station is provided, including: a processor, a memory, and a bus, where the processor is connected to the memory by using the bus, the memory is configured to store code; and when the processor runs the code stored by the memory, the following steps are performed:

the processor is configured to: before the base station allocates a pilot to a first user, determine interference between the first user and a second user if a pilot of the second user is allocated to the first user; and the processor is further configured to allocate a pilot to the first user according to the interference between the first user and the second user, where if the interference between the first user and the second user is less than a preset threshold, the pilot allocated to the first user is the same as the pilot used by the second user; or if the interference between the first user and the second user is greater than or equal to the preset threshold, the pilot allocated to the first user is different from the pilot used by the second user.

With reference to the second aspect, in a first possible implementation manner, if interference between N second users and the first user is less than the preset threshold value, and N is a natural number greater than or equal to 2, the processor is further configured to:

acquire a sum of interference corresponding to a pilot of each second user of the N second users, where a sum of interference corresponding to a pilot of the $i^{th}$ second user of the N second users is:

a sum of interference between the first user and all second users of the pilot of the $i^{th}$ second user when the pilot of the $i^{th}$ second user is allocated to the first user, where 1≤i≤N; and the processor is further configured to: if a sum of interference corresponding to a pilot of the $j^{th}$ second user of the N second users is the smallest, allocate the pilot of the $j^{th}$ second user to the first user, where 1≤j≤N.

With reference to the second aspect or the first possible implementation manner of the second aspect, in a second possible implementation manner, the processor is further configured to:

perform spatial multiplexing on pilots of the first user and paired users, where the paired users are users that use a same pilot as the first user.

With reference to the second possible implementation manner of the second aspect, in a third possible implementation manner, the processor is specifically configured to:

pre-code the pilots of the first user and the paired users.

With reference to the second possible implementation manner of the second aspect, in a fourth possible implementation manner, the processor is specifically configured to:

performing beamforming on pilots of the user to which a pilot is to be allocated and the paired users.

With reference to the second aspect or any one of the first to the fourth possible implementation manners of the second aspect, in a fifth possible implementation manner, the processor is further configured to:

determine, from users to which no pilot is allocated, a user that is first scheduled on a scheduling resource as the first user, where the scheduling resource is a scheduling resource used by the users to which no pilot is allocated.

With reference to the second aspect or any one of the first to the fourth possible implementation manners of the second aspect, in a sixth possible implementation manner, the processor is further configured to:

determine, from users to which no pilot is allocated, a user with a highest priority as the first user.

According to a third aspect, a pilot configuration method is provided, including:

before allocating a pilot to a first user, determining, by a base station, interference between the first user and a second user if the base station allocates a pilot of the second user to the first user; and if the interference between the first user and the second user is less than a preset threshold, the pilot allocated by the base station to the first user is the same as a pilot used by the second user; or if the interference between the first user and the second user is greater than or equal to the preset threshold, the pilot allocated by the base station to the first user is different from the pilot used by the second user.

With reference to the third aspect, in a first possible implementation manner, if interference between N second users and the first user is less than the preset threshold value, and N is a natural number greater than or equal to 2, the method further includes:

acquiring, by the base station, a sum of interference corresponding to a pilot of each second user of the N second users, where a sum of interference corresponding to a pilot of the $i^{th}$ second user of the N second users is:

a sum of interference between the first user and all second users of the pilot of the $i^{th}$ second user when the pilot of the $i^{th}$ second user is allocated to the first user, where 1≤i≤N; and if a sum of interference corresponding to a pilot of the $j^{th}$ second user of the N second users is the smallest, allocating, by the base station, the pilot of the $j^{th}$ second user to the first user, where 1≤j≤N.

With reference to the third aspect or the first possible implementation manner of the third aspect, in a second possible implementation manner, the method further includes:

performing, by the base station, spatial multiplexing on pilots of the first user and paired users, where the paired users are users that use a same pilot as the first user.

With reference to the second possible implementation manner of the third aspect, in a third possible implementation manner, the performing, by the base station, spatial multiplexing on pilots of the first user and the paired users includes:

pre-coding the pilots of the first user and the paired users.

With reference to the second possible implementation manner of the third aspect, in a fourth possible implementation manner, the performing, by the base station, spatial multiplexing on the pilots of the first user and the paired users includes:

performing beamforming on pilots of the user to which a pilot is to be allocated and the paired users.

With reference to the third aspect or any one of the first to the fourth possible implementation manners of the third aspect, in a fifth possible implementation manner, the method further includes:

determining, from users to which no pilot is allocated, a user that is first scheduled on a scheduling resource as the first user, where the scheduling resource is a scheduling resource used by the users to which no pilot is allocated.

With reference to the third aspect or any one of the first to the fourth possible implementation manners of the third aspect, in a sixth possible implementation manner, the method further includes:

determining, from users to which no pilot is allocated, a user with a highest priority as the first user.

In the foregoing solutions, before allocating a pilot to a first user, a base station determines interference between the first user and a second user when a pilot of the second user is allocated to the first user. If the interference that is between the first user and the second user and that is acquired by the interference acquiring unit is less than a preset threshold, the pilot allocated by the base station to the first user is the same as a pilot used by the second user; or if the interference that is between the first user and the second user and that is acquired by the interference acquiring unit is greater than or equal to the preset threshold, the pilot allocated by the base station to the first user is different from the pilot used by the second user. In this way, because interference between users to which a same pilot is allocated is relatively small, accuracy of user channel estimation can be ensured, and multiple users share one pilot, which can reduce pilot overheads. Therefore, pilot overheads are reduced in a case in which accuracy of user channel estimation is ensured.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
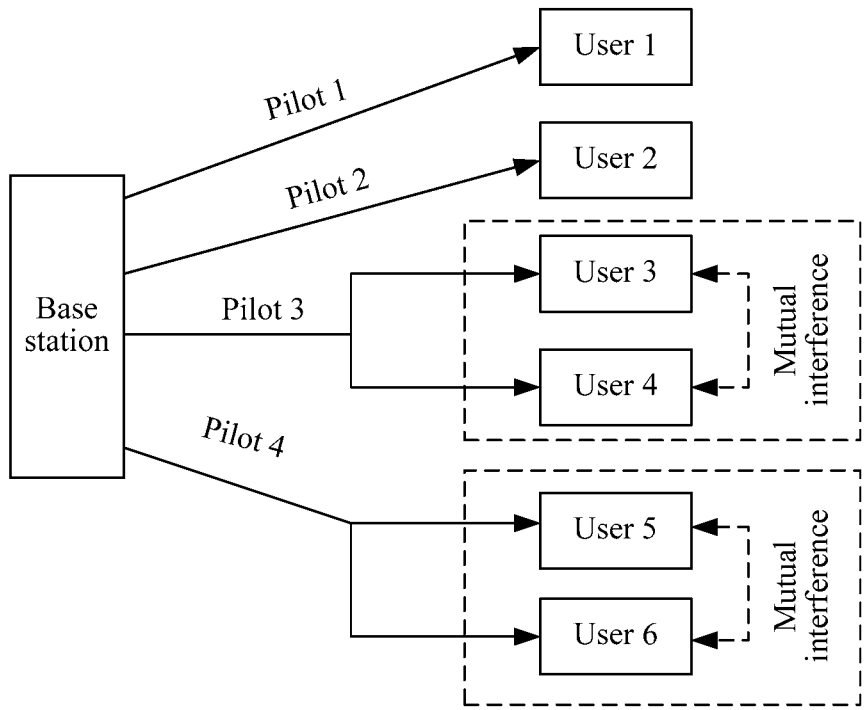
FIG. 1 is a schematic structural diagram of an application scenario according to an embodiment of the present disclosure.

The embodiments of the present disclosure are applied to a communications system using a MU-MIMO technology. Referring to FIG. 1, when a base station transmits data to a user, a pilot needs to be sent to the user to guide the user to perform channel estimation, so that the user can receive the data correctly. One pilot corresponds to one user, or one pilot corresponds to multiple users by means of spatial multiplexing.

Figure 2:
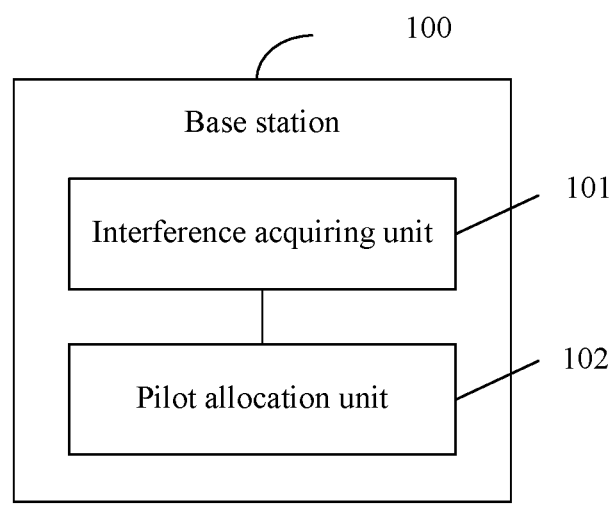
FIG. 2 is a schematic structural diagram of a base station according to an embodiment of the present disclosure.

An embodiment of the present disclosure provides a base station 100, which is configured to configure a pilot for a user. Referring to FIG. 2, the base station 100 includes:

an interference acquiring unit 101, configured to: before a pilot is allocated to a first user, determine interference between the first user and a second user if a pilot of the second user is allocated to the first user.

The first user is a user that is selected by the base station and that is scheduled on a scheduling resource and to which no pilot is allocated, and the second user is a user to which a pilot has been allocated.

The interference acquiring unit 101 acquires the interference between the first user and the second user, and needs to transmit interference data to a pilot allocation unit 102, so that the pilot allocation unit 102 allocates a pilot of a user to the first user according to the interference data, where interference between the user and the first user is relatively small.

The pilot allocation unit 102 is configured to allocate a pilot to the first user according to the interference that is between the first user and the second user and that is acquired by the interference acquiring unit 101, where if the interference that is between the first user and the second user and that is acquired by the interference acquiring unit 101 is less than a preset threshold, the pilot allocated to the first user is the same as a pilot used by the second user.

If the interference that is between the first user and the second user and that is acquired by the interference acquiring unit 101 is greater than or equal to the preset threshold, the pilot allocated to the first user is different from the pilot used by the second user.

When interference between users is less than the preset threshold, it indicates that the interference between the users has relatively little impact on accuracy of user channel estimation, so that accuracy of user channel estimation of all users that use a same pilot can be ensured.

Optionally, if interference between N second users and the first user is less than the preset threshold value, and N is a natural number greater than or equal to 2, the interference acquiring unit 101 is further configured to:

acquire a sum of interference corresponding to a pilot of each second user of the N second users, where a sum of interference corresponding to a pilot of the $i^{th}$ second user of the N second users is:

a sum of interference between the first user and all second users of the pilot of the $i^{th}$ second user when the pilot of the $i^{th}$ second user is allocated to the first user, where $1 \leq i \leq N$; and the pilot allocation unit 102 is further configured to: if a sum of interference, corresponding to a pilot of the $j^{th}$ second user of the N second users, acquired by the interference acquiring unit is the smallest, allocate the pilot of the $j^{th}$ second user to the first user, where $1 \leq j \leq N$.

It can be ensured, only when all interference between users of a same pilot is less than the preset threshold, that the users of the same pilot do not interfere with each other, that is, interference between the first user and each user of a same pilot needs to be compared with the preset threshold. If all interference is less than the preset threshold, the pilot may be allocated to the first user.

Figure 3:
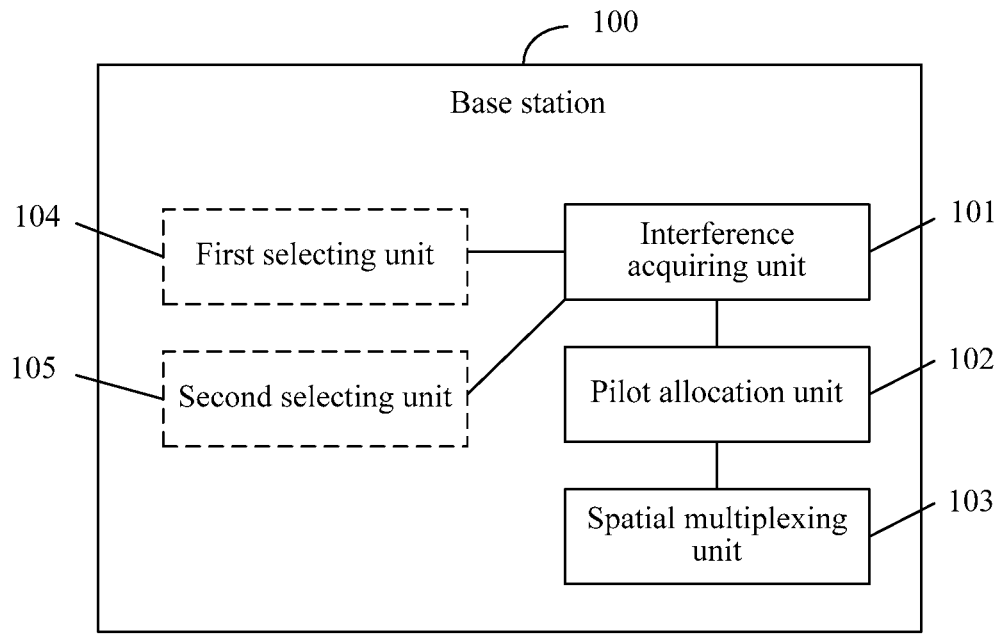
FIG. 3 is a schematic structural diagram of a base station according to another embodiment of the present disclosure.

Optionally, referring to FIG. 3, the base station 100 further includes:

a spatial multiplexing unit 103, configured to perform spatial multiplexing on pilots, allocated by the pilot allocation unit 102, of the first user and paired users, where the paired users are users that use a same pilot as the first user.

After the pilot allocation unit 102 allocates a corresponding pilot to the first user, a next first user is selected. The interference acquiring unit 101 calculates interference for the next first user. The pilot allocation unit 102 allocates a pilot to the next first user. When pilots have been allocated to all users scheduled on the scheduling resource, the spatial multiplexing unit 103 performs spatial multiplexing on the pilots of the first user and the paired users, so as to implement pilot orthogonalization.

Specifically, the spatial multiplexing unit 103 is specifically configured to:

pre-code the pilots of the first user and the paired users; or perform beamforming on the pilots of the first user and the paired users.

A pre-coding manner and a beamforming manner are specific implementation manners for spatial multiplexing. In this way, an orthogonalized pilot is sent to each corresponding user, thereby decreasing a quantity of used pilots, and reducing pilot overheads.

Optionally, the base station further includes:

a first selection unit 104, configured to determine, from users to which no pilot is allocated, a user that is first scheduled on a scheduling resource as the first user.

The scheduling resource is a scheduling resource used by the users to which no pilot is allocated.

Further, optionally, the base station 100 further includes:

a second selection unit 105, configured to determine, from users to which no pilot is allocated, a user with a highest priority as the first user.

Both the first selection unit 104 and the second selection unit 105 are configured to select the first user, and are denoted with dashed boxes in FIG. 3.

In the foregoing embodiment, before allocating a pilot to a first user, a base station determines interference between the first user and a second user if the base station allocates a pilot of the second user to the first user. If the interference that is between the first user and the second user and that is acquired by the interference acquiring unit is less than a preset threshold, the pilot allocated by the base station to the first user is the same as a pilot used by the second user; or if the interference that is between the first user and the second user and that is acquired by the interference acquiring unit is greater than or equal to the preset threshold, the pilot allocated by the base station to the first user is different from a pilot used by the second user. In this way, because interference between users to which a same pilot is allocated is relatively small, accuracy of user channel estimation can be ensured, and multiple users share one pilot, which can reduce pilot overheads. Therefore, pilot overheads are reduced in a case in which accuracy of user channel estimation is ensured.

Figure 4:
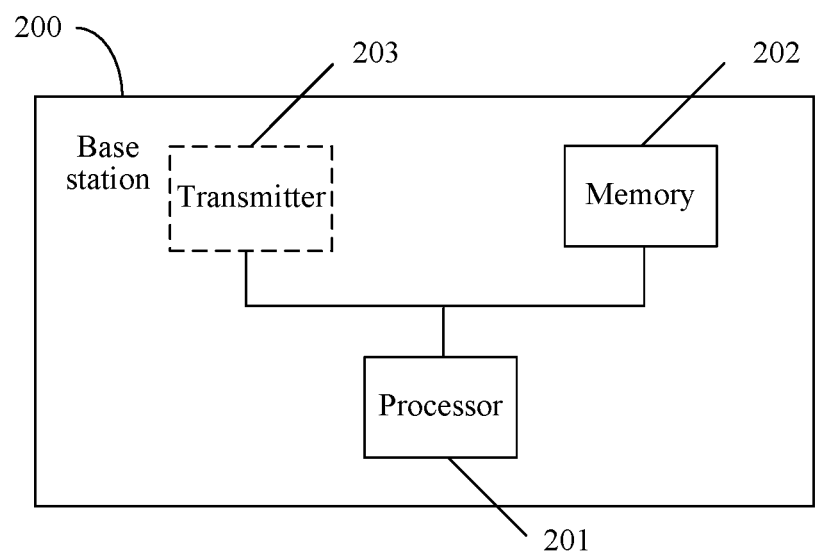
FIG. 4 is a schematic structural diagram of a base station according to still another embodiment of the present disclosure.

An embodiment of the present disclosure provides a base station 200, which is configured to configure a pilot for a user. Referring to FIG. 4, the base station 200 includes: a processor 201 and a memory 202, where the processor 201 is connected to the memory, the memory is configured to store code; and when performing an operation, the processor 201 needs to invoke corresponding code stored by the memory 202 to implement a corresponding function.

Specifically, the memory 202 is configured to store executable program code, where the program code includes a computer operation instruction. The memory 202 may include a high speed RAM memory, and may further include a non-volatile memory, for example, at least one magnetic disk storage.

The processor 201 may be a central processing unit (CPU) or an application-specific integrated circuit (ASIC), or may be configured as one or more integrated circuits for implementing this embodiment of the present disclosure.

The processor 201 is configured to: before a pilot is allocated to a first user, determine interference between the first user and a second user if a pilot of the second user is allocated to the first user.

When performing the operation, the processor 201 invokes code stored by the memory 202, so as to implement a function of the foregoing interference acquiring module.

The first user is a user that is selected by the base station and that is scheduled on a scheduling resource and to which no pilot is allocated, and the second user is a user to which a pilot has been allocated.

The processor 201 is further configured to allocate a pilot to the first user according to the interference between the first user and the second user, where if the interference between the first user and the second user is less than a preset threshold, the pilot allocated to the first user is the same as a pilot used by the second user.

If the interference between the first user and the second user is greater than or equal to the preset threshold, the pilot allocated to the first user is different from the pilot used by the second user.

When performing the operation, the processor 201 invokes code stored by the memory 202, so as to implement a function of the foregoing pilot allocation module.

When interference between users is less than the preset threshold, it indicates that the interference between the users has relatively little impact on accuracy of user channel estimation, so that accuracy of user channel estimation of all users that use a same pilot can be ensured.

Optionally, if interference between N second users and the first user is less than the preset threshold value, and N is a natural number greater than or equal to 2, the processor 201 is further configured to:

acquire a sum of interference corresponding to a pilot of each second user of the N second users, where a sum of interference corresponding to a pilot of the $i^{th}$ second user of the N second users is:

a sum of interference between the first user and all second users of the pilot of the $i^{th}$ second user when the pilot of the $i^{th}$ second user is allocated to the first user, where $1 \leq i \leq N$; and the processor 201 is further configured to: if a sum of interference corresponding to a pilot of the $j^{th}$ second user of the N second users is the smallest, allocate the pilot of the $j^{th}$ second user to the first user, where $1 \leq j \leq N$.

It can be ensured, only when all interference between users of a same pilot is less than the preset threshold, that the users of the same pilot do not interfere with each other, that is, interference between the first user and each user of a same pilot needs to be compared with the preset threshold. If all interference is less than the preset threshold, the pilot may be allocated to the first user.

Optionally, the processor 201 is further configured to:

perform spatial multiplexing on pilots of the first user and paired users, where the paired users are users that use a same pilot as the first user.

When performing the operation, the processor 201 invokes code stored by the memory 202, so as to implement a function of the foregoing spatial multiplexing module.

Specifically, after the processor 201 allocates a corresponding pilot to the first user, a next first user is selected. The processor 201 calculates interference for the next first user. The processor 201 allocates a pilot to the next first user. When pilots have been allocated to all users scheduled on the scheduling resource, the processor 201 performs spatial multiplexing on the pilots of the first user and the paired users, so as to implement pilot orthogonalization.

Specifically, the processor 201 is specifically configured to:

pre-code the pilots of the first user and the paired users; or perform beamforming on the pilots of the first user and the paired users.

A pre-coding manner and a beamforming manner are specific implementation manners for spatial multiplexing. In this way, optionally, the base station may further include a transmitter 203, where the transmitter is connected to the processor 201, is configured to send a pilot signal, and is denoted with a dashed box in FIG. 4. An orthogonalized pilot is sent to each corresponding user by using the transmitter 203, thereby decreasing a quantity of used pilots, and reducing pilot overheads.

Optionally, the processor 201 of the base station 200 is further configured to:

determine, from users to which no pilot is allocated, a user that is first scheduled on the scheduling resource as the first user.

The scheduling resource is a scheduling resource used by the users to which no pilot is allocated.

When performing the operation, the processor 201 invokes code stored by the memory 202, so as to implement a function of the foregoing selection module; or determine, from users to which no pilot is allocated, a user with a highest priority as the first user.

When performing the operation, the processor 201 invokes code stored by the memory 202, so as to implement a function of the foregoing selection module.

In the foregoing embodiment, before allocating a pilot to a first user, a base station determines interference between the first user and a second user when a pilot of the second user is allocated to the first user. If the interference that is between the first user and the second user and that is acquired by the interference acquiring unit is less than a preset threshold, the pilot allocated by the base station to the first user is the same as a pilot used by the second user; or if the interference that is between the first user and the second user and that is acquired by the interference acquiring unit is greater than or equal to the preset threshold, the pilot allocated by the base station to the first user is different from the pilot used by the second user. In this way, because interference between users to which a same pilot is allocated is relatively small, accuracy of user channel estimation can be ensured, and multiple users share one pilot, which can reduce pilot overheads. Therefore, pilot overheads are reduced in a case in which accuracy of user channel estimation is ensured.

Figure 5:
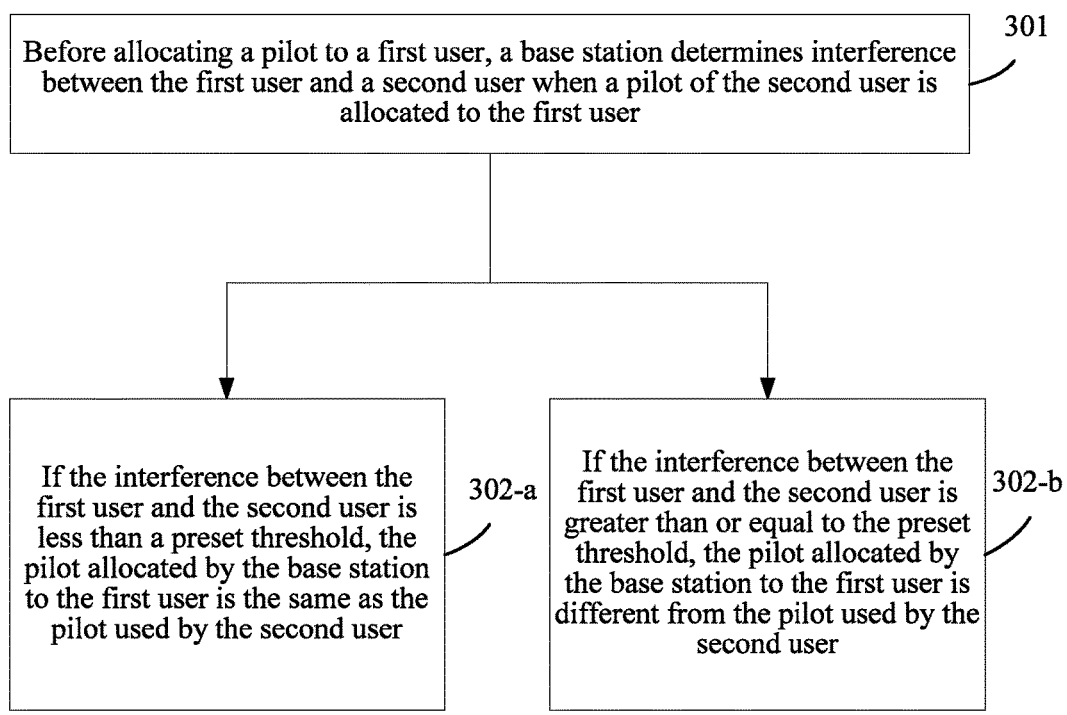
FIG. 5 is a schematic flowchart of a pilot configuration method according to an embodiment of the present disclosure.

An embodiment of the present disclosure provides a pilot configuration method. Referring to FIG. 5, the method includes the following steps:

301: Before allocating a pilot to a first user, a base station determines interference between the first user and a second user if the base station allocates a pilot of the second user to the first user.

The base station may need to transmit data to multiple users on one scheduling resource. To allow a user to receive data correctly, a corresponding pilot needs to be allocated to the user, and the pilot is sent to the user.

The first user is a user that is selected by the base station and that is scheduled on the scheduling resource and to which no pilot is allocated, and the second user is a user to which a pilot has been allocated. Optionally, a specific selection manner includes:

determining, from users to which no pilot is allocated, a user that is first scheduled on the scheduling resource as the first user.

The scheduling resource is a scheduling resource used by the users to which no pilot is allocated, that is, a user that is first scheduled on the scheduling resource is selected, from the users to which no pilot is allocated, as the first user according to a sequence of scheduling users on the scheduling resource; or a user with a highest priority is determined, from the users to which no pilot is allocated, as the first user.

For a priority, reference may be made to a user level, quality of a user channel, and an entire network utility of a user.

Further, a method for calculating interference between two users is (assuming that interference between a user i and a user k is calculated, which is expressed as $I_{i \to k}$) as follows:

$$I_{i \to k} = W_k^H \cdot H_k \cdot P_i^{data}$$

where $W_k^H$ represents a filter vector of a receiver of the user k, $H_k$ represents a channel between the user k and a base station transmit end, and $P_i^{data}$ represents a pre-coding vector of pilot data for the user i.

302: The base station allocates a pilot to the first user according to the interference between the first user and the second user.

Step 302 includes the following two cases:

302-a: If the interference between the first user and the second user is less than a preset threshold, the pilot allocated by the base station to the first user is the same as the pilot used by the second user.

302-b: If the interference between the first user and the second user is greater than or equal to the preset threshold, the pilot allocated by the base station to the first user is different from the pilot used by the second user.

When interference between users is less than the preset threshold, it indicates that the interference between the users has relatively little impact on accuracy of user channel estimation, so that accuracy of user channel estimation of all users that use a same pilot can be ensured.

Figure 6:
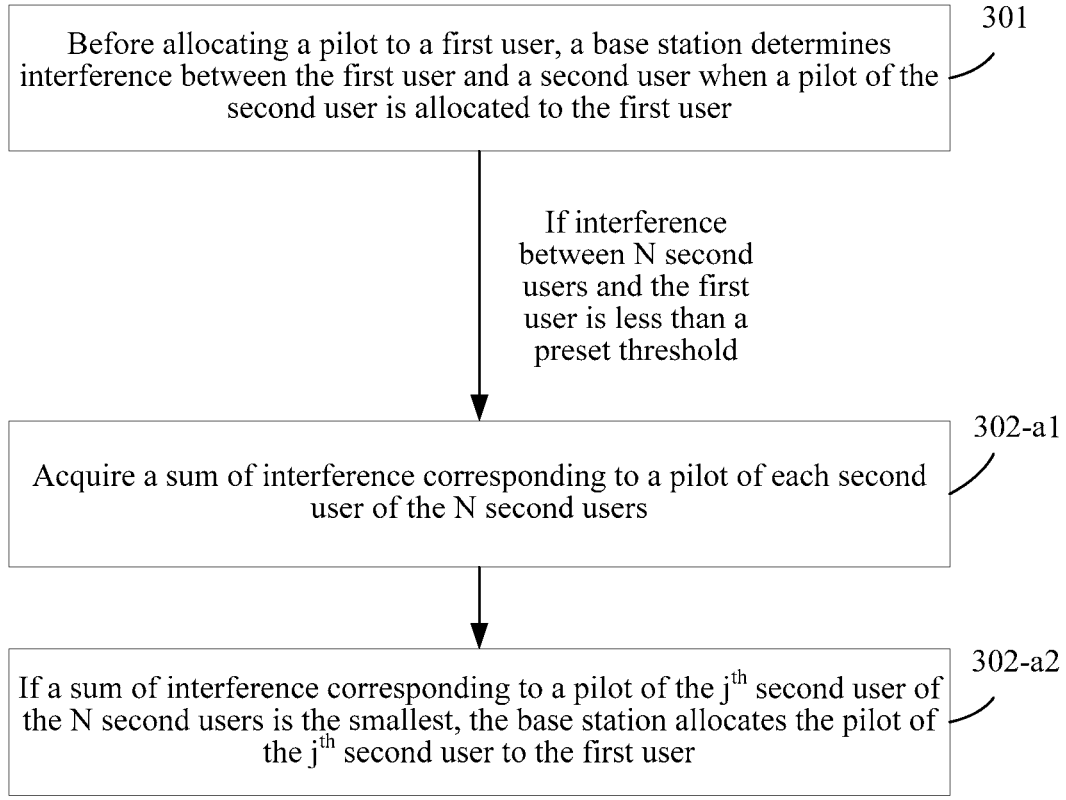
FIG. 6 is a schematic flowchart of a pilot configuration method according to another embodiment of the present disclosure.

Optionally, referring to FIG. 6, when interference between N second users and the first user is less than the preset threshold value, and N is a natural number greater than or equal to 2, 302-a includes:

302-a1: Acquire a sum of interference corresponding to a pilot of each second user of the N second users.

A sum of interference corresponding to a pilot of the $i^{th}$ second user of the N second users is: a sum of interference between the first user and all second users of the pilot of the $i^{th}$ second user when the pilot of the $i^{th}$ second user is allocated to the first user, where $1 \le i \le N$.

Further, 302-a includes:

302-a2: If a sum of interference corresponding to a pilot of the $j^{th}$ second user of the N second users is the smallest, the base station allocates the pilot of the $j^{th}$ second user to the first user, where $1 \le j \le N$.

Further, it can be ensured, only when all interference between users of a same pilot is less than the preset threshold, that the users of the same pilot do not interfere with each other, that is, interference between the first user and each user of a same pilot needs to be compared with the preset threshold. If all interference is less than the preset threshold, the pilot may be allocated to the first user.

Specifically, if all interference between the first user and all users of one and only one pilot is less than the preset threshold, the pilot is allocated to the first user.

If all interference between the first user and all users of more than one pilot is less than the preset threshold, a sum of interference between all users of each pilot of the more than one pilot and the first user is calculated. For example, when interference between all second users of two pilots (referred to as a pilot 1 and a pilot 2) and the first user is less than the preset threshold, a sum of interference between all second users of the pilot 1 and the first user is calculated, a sum of interference between all second users of the pilot 2 and the first user is calculated, the sum of the interference corresponding to the pilot 1 is compared with the sum of the interference corresponding to the pilot 2, and a pilot whose sum of interference is the smallest is allocated to the first user.

Further, optionally, if interference between the first user and any user of each pilot is greater than the preset threshold, that is, for each pilot, interference between at least one user and the first user is greater than the preset threshold, whichever pilot to which the first user is added, the first user causes relatively great interference on a user of the pilot. In this way, a base station needs to allocate, to the first user, a pilot different from that used by the second user, so as to ensure accuracy of user channel estimation.

Figure 7:
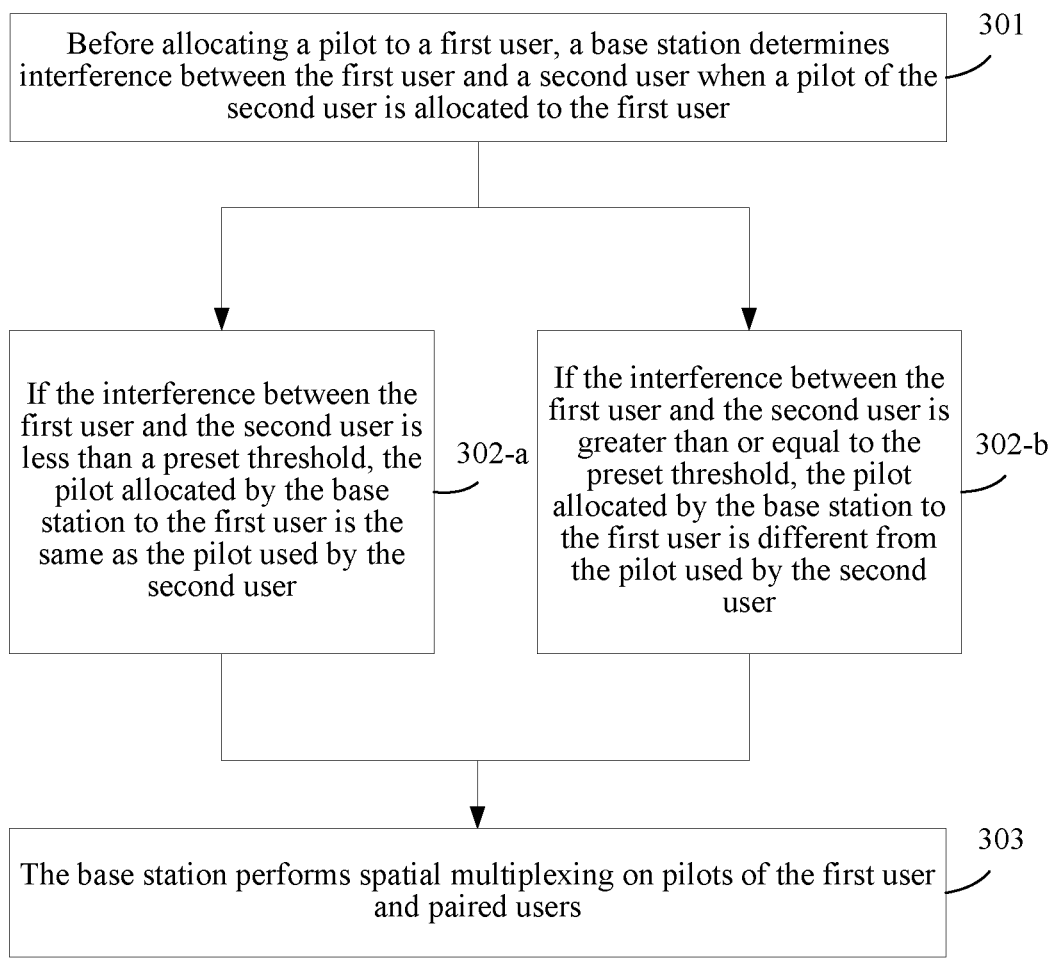
FIG. 7 is a schematic flowchart of a pilot configuration method according to still another embodiment of the present disclosure.

Optionally, referring to FIG. 7, after step 302, the method further includes:

303: The base station performs spatial multiplexing on pilots of the first user and paired users.

The paired users are users that use a same pilot as the first user.

After a corresponding pilot is allocated to the first user, a next first user is selected. Interference between the next first user and a user to which a pilot has been allocated is calculated, and a pilot is allocated to the next first user. When pilots have been allocated to all users scheduled on the scheduling resource, pilot orthogonalization of the first user and the paired users is implemented by means of spatial multiplexing.

Further, optionally, a specific method for spatial multiplexing is:

pre-coding the pilots of the first user and the paired users.

Specifically, in a first step, a pre-coding weight vector corresponding to each user of a pilot is calculated. A method for calculating the pre-coding vector includes a linear pre-coding algorithm (such as a ZF (zero forcing) algorithm, a BD (block diagonalization) algorithm, an RZF (regularized zero forcing) algorithm, an RBD (regularized block diagonalization) algorithm), and a non-linear pre-coding algorithm (such as a DPC (dirty paper coding) algorithm, and a VP (vector perturbation) algorithm). The ZF algorithm is used as an example, and a pre-coding vector of a user i is $P_i^{pilot}$ which is calculated as follows:

$$P = H^H(HH^H)^{-1};$$

$$P_i^{pilot} = P(:,i)$$

where H is downlink channel information of all users, including (k users in total): $[H_1; H_2; K\ K; H_k]$. P is a pre-coding vector matrix, and the pre-coding vector $P_i^{pilot}$ of the user i is the $i^{th}$ column of the pre-coding vector matrix.

In a second step, a pilot is multiplied by a pre-coding vector of each user, and a pilot obtained by multiplication is sent to a corresponding antenna for transmission.

Alternatively, beamforming on pilots of the user to which a pilot is to be allocated and the paired users is performed.

Specifically, in a first step, location information of all users of a same pilot is acquired. A method for acquiring the location information of the users includes: estimating a direction of arrival (DOA) of a signal, or using a global positioning system (GPS).

In a second step, a beamforming weight is generated according to the location information of the users.

In a third step, the pilot is multiplied by the beamforming weight, and a pilot obtained by multiplication is sent to a corresponding antenna to be transmitted. After the pilot is multiplied by the beamforming weight, a main lobe of a transmit beam can be aligned with an optimal path to form a narrow beam at a corresponding user location.

A pre-coding manner and a beamforming manner are specific implementation manners for spatial multiplexing. In this way, an orthogonalized pilot is sent to each corresponding user, thereby decreasing a quantity of used pilots, and reducing pilot overheads.

Figure 8:
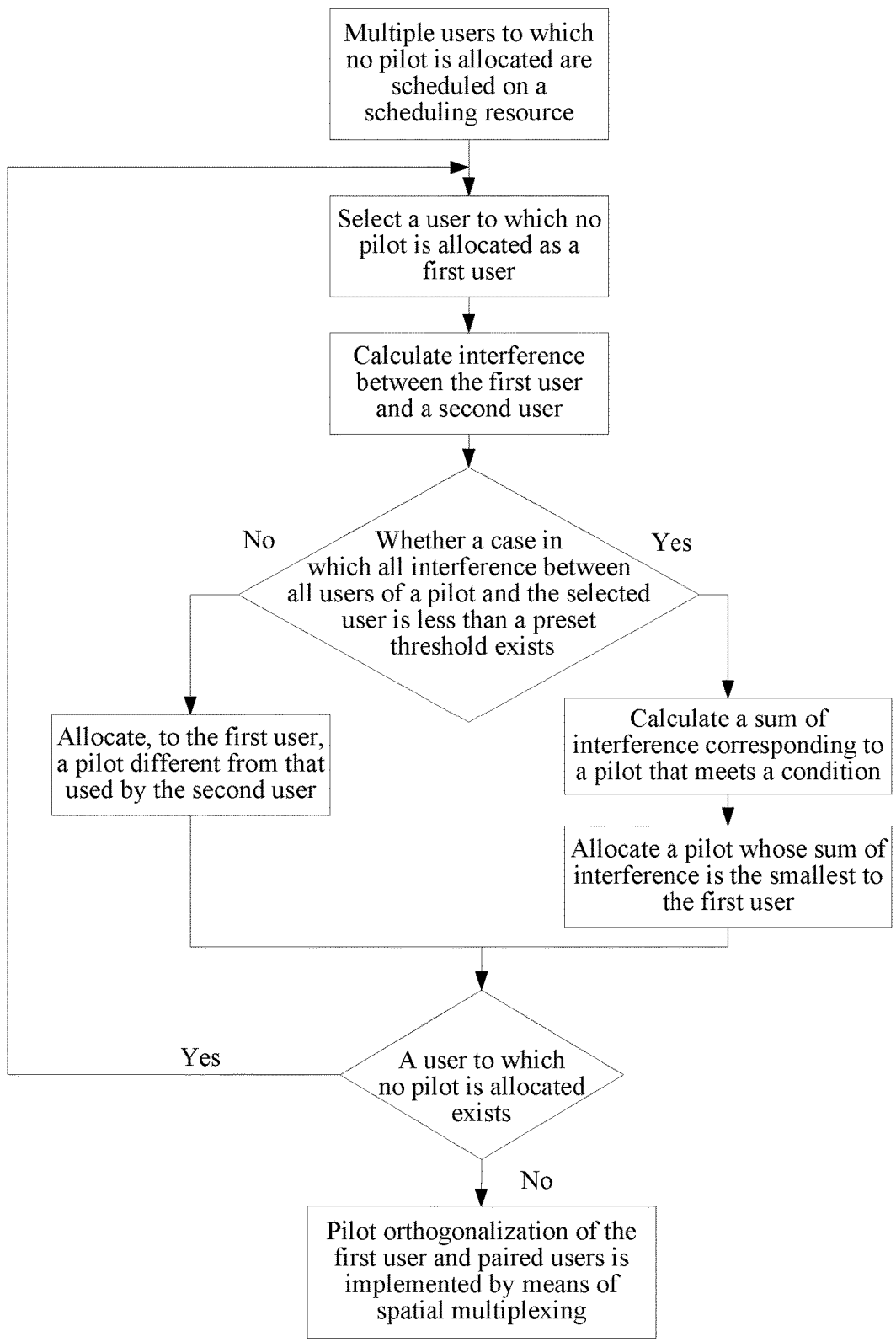
FIG. 8 is a schematic flowchart of a pilot configuration method according to yet another embodiment of the present disclosure.

Exemplarily, referring to FIG. 8, when a pilot needs to be allocated to several users that are scheduled on one scheduling resource and to which no pilot is allocated, a user needs to be selected, from the users to which no pilot is allocated, as a first user, interference between the first user and a second user (a user to which a pilot has been allocated) is calculated, and it is determined whether a case in which all interference between all users of a pilot and the first user is less than a preset threshold exists. If a pilot that meets the condition does not exist, a pilot different from that used by the second user is allocated to the first user; or if the pilot that meets the condition exists, a sum of interference corresponding to the pilot that meets the condition is acquired by means of calculation, and a pilot whose sum of interference is the smallest is allocated to the first user. After a corresponding pilot is allocated to the first user, it is determined whether a user to which no pilot is allocated still exists. If a user to which no pilot is allocated exists, a next user is selected, interference between the next first user and users to which a pilot has been allocated is calculated, and a pilot is allocated to the next first user. The foregoing process is repeated until pilots are allocated to the all users scheduled on the scheduling resource. Orthogonalization of pilots of the first user and paired users is implemented by means of spatial multiplexing. An orthogonalized pilot is sent to each corresponding user, thereby decreasing a quantity of used pilots, and reducing pilot overheads.

In the foregoing embodiment, before allocating a pilot to a first user, a base station determines interference between the first user and a second user when a pilot of the second user is allocated to the first user. If the interference that is between the first user and the second user and that is acquired by the interference acquiring unit is less than a preset threshold, the pilot allocated by the base station to the first user is the same as a pilot used by the second user; or if the interference that is between the first user and the second user and that is acquired by the interference acquiring unit is greater than or equal to the preset threshold, the pilot allocated by the base station to the first user is different from the pilot used by the second user. In this way, because interference between users to which a same pilot is allocated is relatively small, accuracy of user channel estimation can be ensured, and multiple users share one pilot, which can reduce pilot overheads. Therefore, pilot overheads are reduced in a case in which accuracy of user channel estimation is ensured.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A base station, comprising:
   a memory configured to store code; and a processor connected to the memory, such that when the processor runs the code stored by the memory, the following steps are performed:
before a pilot is allocated to a first user, determining interference between the first user and a second user if a pilot of the second user is allocated to the first user, wherein the first user is a user that is selected by the base station to which no pilot is allocated, and the second user is a user to which a pilot has been allocated; and
allocating a pilot to the first user according to the interference between the first user and the second user, wherein if the interference between the first user and the second user is less than a preset threshold, the pilot allocated to the first user is the same as the pilot used by the second user; or if the interference between the first user and the second user is greater than or equal to the preset threshold, the pilot allocated to the first user is different from the pilot used by the second user.

2. The base station according to claim 1, wherein if interference between N second users and the first user is less than the preset threshold value, and N is a natural number greater than or equal to 2, the processor is further configured to:
acquire a sum of interference corresponding to a pilot of each second user of the N second users, wherein a sum of interference corresponding to a pilot of the $i^{th}$ second user of the N second users is a sum of interference between the first user and all second users of the pilot of the $i^{th}$ second user when the pilot of the $i^{th}$ second user is allocated to the first user, wherein $1 \leq i \leq N$; and
if a sum of interference corresponding to a pilot of the $j^{th}$ second user of the N second users is the smallest, allocate the pilot of the $j^{th}$ second user to the first user, wherein $1 \leq j \leq N$.

3. The base station according to claim 1, wherein the processor is further configured to:
perform spatial multiplexing on pilots of the first user and paired users, wherein the paired users are users that use a same pilot as the first user.

4. The base station according to claim 3, wherein the processor is further configured to:
pre-code the pilots of the first user and the paired users.

5. The base station according to claim 3, wherein the processor is further configured to:
perform beamforming on pilots of the user to which a pilot is to be allocated and the paired users.

6. The base station according to claim 1, wherein the processor is further configured to:
determine, from users to which no pilot is allocated, a user that is first scheduled on a scheduling resource as the first user, wherein the scheduling resource is a scheduling resource used by the users to which no pilot is allocated.

7. The base station according to claim 1, wherein the processor is further configured to:
determine, from users to which no pilot is allocated, a user with a highest priority as the first user.

8. A pilot configuration method, comprising:
before allocating a pilot to a first user, determining, by a base station, interference between the first user and a second user if the base station allocates a pilot of the second user to the first user, wherein the first user is a user that is selected by the base station to which no pilot is allocated, and the second user is a user to which a pilot has been allocated; and
allocating, by the base station, a pilot to the first user according to the interference between the first user and the second user, wherein if the interference between the first user and the second user is less than a preset threshold, the pilot allocated by the base station to the first user is the same as a pilot used by the second user; or if the interference between the first user and the second user is greater than or equal to the preset threshold, the pilot allocated by the base station to the first user is different from the pilot used by the second user.

9. The method according to claim 8, wherein if interference between N second users and the first user is less than the preset threshold value, and N is a natural number greater than or equal to 2, the method further comprises:
acquiring, by the base station, a sum of interference corresponding to a pilot of each second user of the N second users, wherein a sum of interference corresponding to a pilot of the $i^{th}$ second user of the N second users is:
a sum of interference between the first user and all second users of the pilot of the $i^{th}$ second user when the pilot of the $i^{th}$ second user is allocated to the first user, wherein $1 \leq i \leq N$; and
if a sum of interference corresponding to a pilot of the $j^{th}$ second user of the N second users is the smallest, allocating, by the base station, the pilot of the $j^{th}$ second user to the first user, wherein $1 \leq j \leq N$.

10. The method according to claim 8, wherein the method further comprises:
performing, by the base station, spatial multiplexing on pilots of the first user and paired users, wherein the paired users are users that use a same pilot as the first user.

11. The method according to claim 10, wherein the performing, by the base station, spatial multiplexing on pilots of the first user and the paired users comprises:
pre-coding the pilots of the first user and the paired users.

12. The method according to claim 10, wherein the performing, by the base station, spatial multiplexing on pilots of the first user and the paired users comprises:
performing beamforming on pilots of the user to which a pilot is to be allocated and the paired users.

13. The method according to claim 8, wherein the method further comprises:
determining, from users to which no pilot is allocated, a user that is first scheduled on a scheduling resource as the first user, wherein the scheduling resource is a scheduling resource used by the users to which no pilot is allocated.

14. The method according to claim 8, wherein the method further comprises:
determining, from users to which no pilot is allocated, a user with a highest priority as the first user.

* * * * *